(12) United States Patent
Kim et al.

(10) Patent No.: US 11,024,881 B2
(45) Date of Patent: Jun. 1, 2021

(54) ELECTROLYTE ADDITIVE AND LITHIUM SECONDARY BATTERY COMPRISING SAME

(71) Applicant: SOULBRAIN CO., LTD., Seongnam-si (KR)

(72) Inventors: Jae Yoon Kim, Seongnam-si (KR); Hyeong Kyu Lim, Seongnam-si (KR); Jong Hyun Lee, Seongnam-si (KR); Ji Seong Han, Seongnam-si (KR)

( * ) Notice: Subject to any disclaimer, the term of this patent is extended or adjusted under 35 U.S.C. 154(b) by 64 days.

(21) Appl. No.: 16/293,685

(22) Filed: Mar. 6, 2019

(65) Prior Publication Data

US 2019/0207258 A1    Jul. 4, 2019

Related U.S. Application Data

(63) Continuation of application No. PCT/KR2017/009758, filed on Sep. 6, 2017.

(30) Foreign Application Priority Data

| Sep. 7, 2016 | (KR) | 10-2016-0115146 |
| Dec. 20, 2016 | (KR) | 10-2016-0174854 |
| Jun. 27, 2017 | (KR) | 10-2017-0081412 |

(51) Int. Cl.
*H01M 4/02* (2006.01)
*H01M 10/0567* (2010.01)
(Continued)

(52) U.S. Cl.
CPC ....... *H01M 10/0567* (2013.01); *H01M 4/131* (2013.01); *H01M 10/0525* (2013.01);
(Continued)

(58) Field of Classification Search
CPC ...................................................... H01M 4/02
See application file for complete search history.

(56) References Cited

U.S. PATENT DOCUMENTS

| 2008/0286649 | A1* | 11/2008 | Li | H01M 10/0569 429/188 |
| 2015/0311563 | A1* | 10/2015 | Abe | H01M 4/525 429/332 |
| 2015/0364765 | A1* | 12/2015 | Morishima | H01M 10/052 429/221 |

FOREIGN PATENT DOCUMENTS

| JP | 2007538375 A | 12/2007 |
| JP | 2015191851 A | 11/2015 |

(Continued)

OTHER PUBLICATIONS

International Search Report for PCT/KR2017/009758 dated Dec. 28, 2017.

*Primary Examiner* — Jacob B Marks
(74) *Attorney, Agent, or Firm* — Jongkook Park

(57) ABSTRACT

The present invention provides an electrolyte additive comprising a salt of an anion, derived from a nitrogen-atom-containing compound, with Cs+ or Rb+.
Further, the present invention provides an electrolyte additive further comprising lithium difluoro bis(oxalato) phosphate.
The present invention provides a non-aqueous electrolyte comprising a lithium salt, a non-aqueous organic solvent, and the electrolyte additive, and may provide a lithium secondary battery comprising: a cathode employing a cathode active material; an anode employing an anode active material; a separator interposed between the cathode and the anode; and the non-aqueous electrolyte.

11 Claims, 1 Drawing Sheet

(51) Int. Cl.
  *H01M 10/0525*   (2010.01)
  *H01M 10/0568*   (2010.01)
  *H01M 4/131*     (2010.01)
  H01M 10/0569     (2010.01)
  H01M 4/505       (2010.01)
  H01M 4/525       (2010.01)

(52) U.S. Cl.
  CPC ........ *H01M 10/0568* (2013.01); *H01M 4/505* (2013.01); *H01M 4/525* (2013.01); *H01M 10/0569* (2013.01); *H01M 2300/0025* (2013.01)

(56) References Cited

FOREIGN PATENT DOCUMENTS

| | | |
|---|---|---|
| JP | 2016062820 A | 4/2016 |
| KR | 1020140039234 A | 4/2014 |
| KR | 1020150050493 A | 5/2015 |

\* cited by examiner

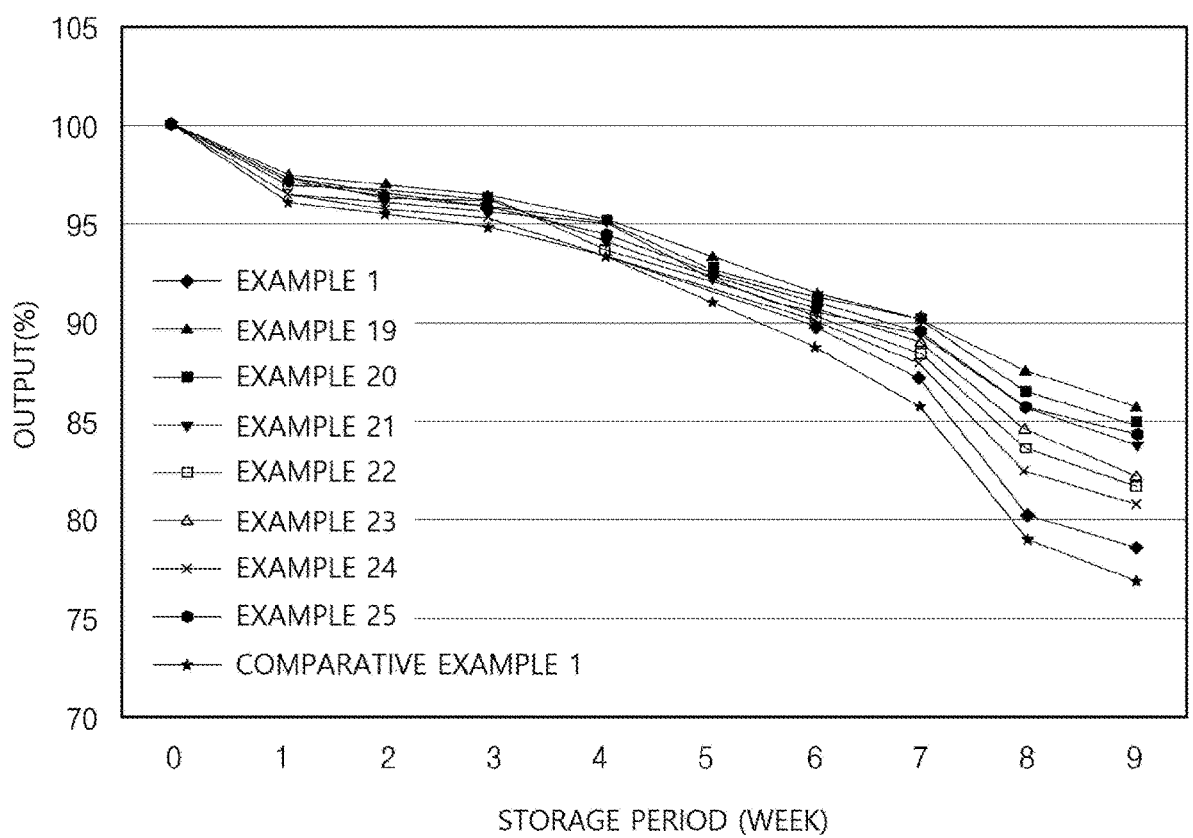

ELECTROLYTE ADDITIVE AND LITHIUM SECONDARY BATTERY COMPRISING SAME

CROSS-REFERENCE TO RELATED APPLICATIONS

This application claims priority under 35 U.S.C. § 119 to Korean Patent Application No. 10-2016-0115146, filed on Sep. 7, 2016, Korean Patent Application No. 10-2016-0174854, filed on Dec. 20, 2016, and Korean Patent Application No. 10-2017-0081412, filed on Jun. 27, 2017, in the Korean Intellectual Property Office, the disclosures of which are incorporated herein by reference in their entirety.

TECHNICAL FIELD

The following disclosure relates to an electrolyte additive and a lithium secondary battery including the same in a non-aqueous electrolyte.

BACKGROUND

In accordance with the recent development of the information and communication industry, electronic devices are becoming smaller, lighter, thinner, and more portable. As a result, there is a growing demand for high energy densification of the batteries used as power sources for these electronic devices. As lithium secondary batteries are best able to meet these demands, research thereon is being actively conducted.

Lithium secondary batteries include a cathode, an anode, an electrolyte providing a pathway for the movement of lithium ions between the cathode and the anode, and a separator. Electrical energy is generated by oxidation and reduction reactions when lithium ions are intercalated and de-intercalated in the cathode and anode.

Lithium secondary batteries have an average discharge voltage of about 3.6 to 3.7 V, presenting an advantage in that the discharge voltage thereof is higher than other alkaline batteries and nickel-cadmium batteries. In order to achieve such a high driving voltage, an electrolyte composition which is electrochemically stable at a charge-discharge voltage range of 0 to 4.2V is required.

At the time of initial charging of a lithium secondary battery, lithium ions generated from a cathode active material such as a lithium metal oxide, or the like, migrate to an anode active material such as a graphite-based material, or the like, and are intercalated between the layers of the anode active material. Herein, since lithium is highly reactive, it reacts at the surface of the anode active material (such as a graphite-based material) with the electrolyte and the carbon composing the anode active material, thereby resulting in the production of compounds such as $Li_2CO_3$, $Li_2O$, or LiOH. These compounds form a solid electrolyte interface (SEI) film on the surface of the anode active material.

The SEI film acts as an ion tunnel and allows only lithium ions to pass through. Since the SEI film has the effect of an ion tunnel, it blocks organic solvent molecules with a high molecular weight moving together with the lithium ions in the electrolyte from being inserted between the layers of the anode active material, thereby preventing the anode structure from being destroyed. Therefore, it is possible to prevent contact between the electrolyte and the anode active material, and thus degradation of the electrolyte does not occur and the amount of lithium ions in the electrolyte is reversibly maintained, thereby enabling the charge/discharge to be maintained stably.

In the related art, it is difficult to expect to achieve an improvement in the lifetime characteristics of lithium ion secondary batteries due to the formation of an uneven SEI film in the case of employing an electrolyte that does not contain an electrolyte additive or an electrolyte that contains an electrolyte additive with poor characteristics. Further, even when an electrolyte additive is included, in the event that the amount of the electrolyte additive cannot be adjusted to a required amount, problems have been encountered in which the electrolyte additive causes degradation of the cathode surface or an oxidation reaction of the electrolyte during high temperature or high voltage reactions, ultimately resulting in an increase of the irreversible capacity loss of the secondary battery, with deterioration of the lifetime characteristics.

SUMMARY

An embodiment of the present invention is directed to providing a novel electrolyte additive.

Another embodiment of the present invention is directed to providing a lithium secondary battery comprising a cathode employing a cathode active material, an anode employing an anode active material, a separator interposed between the cathode and the anode, and a non-aqueous electrolyte containing the electrolyte additive of the present invention.

To resolve the above-mentioned problems, the present invention provides an electrolyte additive comprising a salt of an anion with $Cs^+$ or $Rb^+$, the anion being derived from a nitrogen atom-containing compound.

Further, the present invention provides an electrolyte additive further comprising lithium difluoro bis(oxalato).

The present invention provides a non-aqueous electrolyte comprising a lithium salt, a non-aqueous organic solvent and the electrolyte additive.

Further, the present invention provides a lithium secondary battery comprising a cathode employing a cathode active material; an anode employing an anode active material; a separator interposed between the cathode and the anode; and the non-aqueous electrolyte as described above.

BRIEF DESCRIPTION OF THE DRAWINGS

FIG. 1 is a graph showing the high temperature output characteristics of the Examples and Comparative Examples of the present invention.

DETAILED DESCRIPTION OF EMBODIMENTS

Hereinafter, the present disclosure will be described in more detail to assist in understanding the technical ideas of the present disclosure.

The terms and words used in the present specification and claims should not be construed as being limited to ordinary or dictionary definitions, but should be interpreted as having the meanings and concepts relevant to the technical scope of the present disclosure based on the principle in which an inventor can appropriately define the concept s of the terms in order to describe their own disclosures in the best way.

A novel electrolyte additive according to an embodiment of the present invention may comprise a salt of an anion with $Cs^+$ or $Rb^+$, and the anion being derived from a nitrogen atom-containing compound.

Here, the anion derived from a nitrogen atom-containing compound may be one or more selected from the group consisting of amide-based anions, imide-based anions, nitrile-based anions, nitrite anions, and nitrate anions.

Specifically, the amide-based anion may be one or more selected from the group consisting of a dimethylformamide anion, a dimethylacetamide anion, a diethylformamide anion, a diethylacetamide anion, a methylethylformamide anion, and a methylethylacetamide anion.

Further, the imide-based anion may be represented by Chemical Formula 1 below.

[Chemical Formula 1]

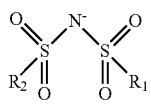

Here, $R_1$ and $R_2$ are each a fluoro group or a $C_1$-$C_4$ fluoroalkyl group, or $R_1$ and $R_2$ may be linked to each other to form a $C_1$-$C_4$ fluoro cycloalkylene ring.

The nitrile-based anion may be one or more selected from the group consisting of an acetonitrile anion, a propionitrile anion, a butyronitrile anion, a valeronitrile anion, a caprylonitrile anion, a heptanenitrile anion, a cyclopentane carbonitrile anion, a cyclohexane carbonitrile anion, a 2-fluorobenzonitrile anion, a 4-fluorobenzonitrile anion, a difluorobenzonitrile anion, a trifluorobenzonitrile anion, a phenylacetonitrile anion, a 2-fluorophenylacetonitrile anion, and a 4-fluorophenylacetonitrile anion.

Further, the compound represented by Chemical Formula 1 may include one or more selected from the group consisting of Chemical Formulas 2 to 6 below.

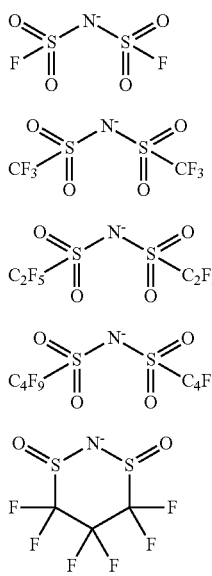

[Chemical Formula 2]

[Chemical Formula 3]

[Chemical Formula 4]

[Chemical Formula 5]

[Chemical Formula 6]

According to an embodiment of the present invention, the electrolyte additive may be one or more selected from the group consisting of cesium bis(trifluoromethanesulfonyl) imide, cesium nitrate, rubidium bis(trifluoromethanesulfonyl)imide, rubidium nitrate, and cesium bis(fluorosulfonyl) imide.

In addition, the present disclosure may provide a non-aqueous electrolyte comprising: a lithium salt, a non-aqueous organic solvent, and the electrolyte additive as described above.

The additive can easily form a coating film on the surface of the cathode and anode in an electrolyte. In general, in an environment in which a secondary battery is repeatedly charged and discharged, an oxidation reaction proceeds on the surface of the cathode, and a reduction reaction proceeds on the surface of the anode. The additive according to an embodiment of the present disclosure may form coating films on the surfaces of the cathode and the anode to effectively control the elution of lithium ions generated from the cathode and to prevent degradation of the cathode. More specifically, the coating film formed by the additive on the surface of the anode is partially degraded through a reduction reaction occurring at the time of the charging and discharging of the battery, but the degraded additive again moves to the surface of the cathode where it is again able to form a film on the surface of the cathode through an oxidation reaction. Therefore, even when charging and discharging processes are repeated several times, the additive may maintain the film coating on the surface of the cathode, thereby effectively preventing excessive elution of lithium ions from the cathode. The reason for this is not clear, but is presumably a result of the closeness in the chemical properties of the $Cs^+$ or $Rb^+$ possessed by the additive according to an embodiment of the present disclosure, as ions of an alkaline group element, with the properties of the $Li^+$ present in the cathode and the anode. Therefore, the secondary battery according to an embodiment of the present disclosure may achieve improvement of the high temperature and low temperature lifetime characteristics through effective maintenance of the structure by preventing the degradation of the structure of the cathode, even when the cathode is repeatedly charged and discharged.

In the related art, when a conventional electrolyte or additive is used in a lithium secondary battery, the additive causes degradation of the surface of the cathode and oxidation of the electrolyte due to an increase in reactivity between the cathode and the electrolyte, thus resulting in deterioration in the safety and performance of the battery. When stored at low or high temperatures, conventionally employed additives undergo excessive degradation and a very thick insulator is formed on the cathode, thereby preventing the migration of lithium ions, and thus the recovery capacity is not generated at all.

However, the employment of additives according to an embodiment of the present invention may reduce both the side-reactivity between the cathode and the electrolyte and the occurrence of the contact surface thereof, leading to an improvement in the safety of the battery. Due to the characteristics of having a high reaction potential and an almost nonexistent change in the reaction potential following cycle progression, it is possible to prevent the deterioration of battery performance due to degradation of additives and the rapid change of reaction potential observed in the related art. Further, the additive of the present invention forms a stable coating film through an oxidation reaction at the cathode to prevent the degradation of the cathode and suppress elution, and thus it is possible to provide more stable protection of the cathode under a high voltage environment.

According to another embodiment of the present invention, different kinds of additives can be additionally comprised as the additive for facilitating stability of the lithium secondary battery and improvement of output. That is, the electrolyte additive comprising the salt of an anion with $Cs^+$ or $Rb^+$, the anion being derived from a nitrogen atom-containing compound, further includes one or more selected from a group consisting of lithium difluoro bis(oxalato), more specifically, cesium bis(trifluoromethanesulfonyl)imide, cesium nitrate, rubidium bis(trifluoromethanesulfonyl)imide, rubidium nitrate, and cesium bis(fluorosulfonyl)imide, and lithium difluoro bis(oxalato) phosphate.

Lithium difluoro bis(oxalato) phosphate can form a stable SEI coating film, and thus, the addition of an additive simultaneously comprising the salt of the anion derived from a nitrogen atom-containing compound with $Cs^+$ or $Rb^+$ and lithium difluoro bis(oxalato) to the electrolyte may enable the formation of a more uniform SEI coating film on the anode and cathode, formed from the difluoro bis(oxalato) phosphate. This uniform formation of the coating film facilitates the movement of lithium ions, thus making it possible to secure more improved output characteristics.

In order to obtain the above-described effects, the additive including the salt of an anion with $Cs^+$ or $Rb^+$ and the lithium difluoro bis(oxalato) phosphate are preferably included at a weight ratio of 1:1 to 1:4 in the electrolyte.

According to an embodiment of the present disclosure, the content of the additive may be 0.05 to 10 wt % based on the total amount of the non-aqueous electrolyte. Preferably, the content of the additive may be 0.1 to 3 wt % based on the total amount of the non-aqueous electrolyte.

If the content of the additive is less than 0.05 wt %, the effect of improving the low and high temperature storage characteristics and the high temperature lifetime characteristics of the lithium secondary battery may be insignificant. Alternatively, if the content of the additive exceeds 10 wt %, the resistance may increase due to excessive formation of the coating film.

In particular, when the additives are applied to a lithium secondary battery, it is possible to improve the low and high temperature storage characteristics as well as the high temperature lifetime characteristics of the additive containing the salt with $Cs^+$ or $Rb^+$, thereby securing the stability of the constructed secondary battery through minimization of the thickness change rate. Particularly, in addition to the effect of improving the lifetime and resistance characteristics of the secondary battery at high temperatures, the high temperature output characteristics of the constructed secondary battery may also be secured through the uniform formation of the coating film.

As the lithium salt, any lithium salt commonly used in the art may be used, and, for example, the lithium salt may be one or more selected from a group consisting of $LiPF_6$, LiFSI, $LiAsF_6$, $LiCF_3SO_3$, $LiN(CF_3SO_2)_2$, $LiBF_4$, $LiSbF_6$, $LiN(C_2F_5SO_2)_2$, $LiAlO_4$, $LiAlCl_4$, $LiSO_3CF_3$, LiTFSI, LiDFOB, and $LiClO_4$.

The concentration of the lithium salt in the non-aqueous electrolyte is preferably 0.01 mol/L to 2 mol/L, and more preferably 0.01 mol/L to 1 mol/L.

Further, as the non-aqueous organic solvent employed in the present disclosure, any organic solvents commonly used in electrolytes for lithium secondary batteries may be used without limitation, and for example, as the non-aqueous organic solvent, ether, ester, amide, linear carbonate, cyclic carbonate, phosphate-based compounds, nitrile-based compounds, fluorinated ether-based compounds, and fluorinated aromatic-based compounds may be used solely or as a combination of 2 or more.

Among these non-aqueous organic solvents, representatively, a carbonate compound which is a cyclic carbonate, a linear carbonate or a mixture thereof may be employed. Specific examples of the cyclic carbonate compound may include one or more selected from a group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and a halide thereof.

Further, as a specific example of the linear carbonate compound, one or more selected from a group consisting of dimethyl carbonate (DMC), diethyl carbonate (DEC), dipropyl carbonate (DPC), ethyl methyl carbonate (EMC), methyl propyl carbonate (MPC), and ethyl propyl carbonate may be included, but the linear carbonate compound is not limited thereto.

More specifically, the cyclic carbonate in a carbonate-based electrolyte solvent preferably comprises propylene carbonate, ethylene carbonate, or a mixture thereof, which is preferable since these are high-viscosity organic solvents and thereby have a high permittivity to dissociate the lithium salt in the electrolyte well.

Further, it is preferable to use a mixture of the cyclic carbonate with a linear carbonate such as diethyl carbonate, dimethyl carbonate, ethyl methyl carbonate or a mixture thereof. Employment of a mixture of the cyclic carbonate with a linear carbonate having low viscosity and low permittivity at an appropriate ratio enables the preparation of an electrolyte having a high electric conductivity, thereby making the use thereof much more preferable.

Examples of the ester for the electrolyte solvent may include one or more selected from a group consisting of methyl acetate, ethyl acetate, propyl acetate, ethyl propionate (EP), propyl propionate, methyl propionate (MP), γ-butyrolactone, γ-valerolactone, γ-caprolactone, δ-valerolactone, and ε-caprolactone. However, among these examples, it is particularly preferable to include ethyl propionate (EP), propyl propionate, methyl propionate (MP), or a mixture thereof, as they have low viscosity.

The phosphoric acid-based solvent and mononitrile-based solvent may be substituted with a fluorine atom (F). When the solvent is substituted with a halogen element, a great increase in the flame retardancy is observed. However, when the solvent is substituted with Cl, Br, I, or the like, the reactivity of the solvent increases together, which is not preferable as an electrolyte.

In the non-aqueous electrolyte of the present disclosure, non-limiting examples of the phosphate-based compound may include trimethylphosphine oxide, triethylphosphine oxide, tripropylphosphine oxide, triphenylphosphine oxide, diethyl methylphosphonate, dimethyl methylphosphonate, diphenyl methylphosphonate, bis(2,2,2-trifluoroethyl) methylphosphonate, trimethyl phosphate, triethyl phosphate, tripropyl phosphate, ethyl methyl phenyl phosphate, and the like. These phosphate-based solvents may be used alone or in combinations of two or more thereof.

Further, non-limiting examples of the nitrile-based compound may include acetonitrile, propionitrile, butyronitrile, valeronitrile, caprilonitrile, heptanenitrile, cyclopentanecarbonitrile, cyclohexanecarbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, and the like. These nitrile-based solvents may be used alone or in combinations of two or more thereof.

In addition, examples of the fluorinated ether-based compound may include bis-2,2,2-trifluoroethyl ether, n-butyl-1,1,2,2-tetrafluoroethyl ether, 2,2,3,3,3-pentafluoropropyl methyl ether, 2,2,3,3,3-pentafluoropropyl, 1,1,2,2-tetrafluoro ethyl ether, 1,1,2,2-tetrafluoroethyl methyl ether, 1,1,2,2-tetrafluoroethyl ethyl ether, trifluoroethyl dodecafluorohexyl ether, and the like, but the fluorinated ether-based compound is not limited thereto. These fluorinated ether-based solvents may be used alone or in combinations of two or more thereof.

Non-limiting examples of the aromatic compound-based solvent may include halogenated benzene compounds such as chlorobenzene, chlorotoluene, fluorobenzene, and the like, and alkylated aromatic compounds such as tert-butylbenzene, tert-pentylbenzene, cyclohexylbenzene, hydrogen biphenyl, hydrogenated terphenyl, and the like. Here, an alkyl group of the alkylated aromatic compound may be halogenated, and as an example thereof, the alkyl group may be fluorinated. Examples of the fluorinated compound may include trifluoromethoxy benzene, and the like.

Meanwhile, the lithium secondary battery according to an embodiment of the present disclosure may comprise a cathode employing a cathode active material, an anode employing an anode active material, a separator interposed between the cathode and the anode, and the non-aqueous electrolyte.

For the cathode, any cathode active material may be used without limitation if it is a compound capable of reversibly intercalating/de-intercalating lithium.

In the lithium secondary battery according to the embodiment of the present disclosure, the cathode active material may include one or more selected from a group consisting of spinel lithium transition metal oxides with high capacity characteristics and having a hexagonal layered rock-salt structure, olivine structure or cubic structure, $V_2O_5$, TiS, and MoS. More specifically, the cathode active material may include, for example, one or more compounds selected from a group consisting of the compounds represented by Chemical Formulas 7 to 9 below:

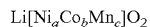   [Chemical Formula 7]

(Where $0.1 \leq c \leq 0.5$, $0 < a+b < 0.9$, $a+b+c=1$);

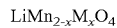   [Chemical Formula 8]

(Where M is one or more elements selected from a group consisting of Ni, Co, Fe, P, S, Zr, Ti and Al, and $0 < x \leq 2$);

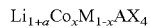   [Chemical Formula 9]

(Where M is one or more elements selected from a group consisting of Al, Mg, Ni, Co, Mn, Ti, Ga, Cu, V, Nb, Zr, Ce, In, Zn and Y, X is one or more elements selected from a group consisting of O, F, and N, A is P, S or a mixture element thereof, and $0 \leq a \leq 0.2$, $0.5 \leq x \leq 1$).

The cathode active material may preferably include one or more selected from a group consisting of Li[$Ni_{0.6}Co_{0.2}Mn_{0.2}$]$O_2$, Li[$Ni_{0.5}Co_{0.2}Mn_{0.3}$]$O_2$, Li[$Ni_{1/3}Co_{1/3}Mn_{1/3}$]$O_2$, and $LiCoO_2$.

According to a particularly preferable embodiment, Li[$Ni_aCo_bMn_c$]$O_2$ may be used for the cathode to thereby achieve a synergistic effect in combination with the compound of Chemical Formula 1 of the present disclosure. When a lithium-nickel-manganese-cobalt-based oxide is employed for the cathode active material, it may have an unstable structure due to cationic mixing in which monovalent Li ions ($Li^+$) and divalent Ni ions ($Ni^{+2}$) become switched in the layered structure of the cathode active material during the charge/discharge process as the content of Ni metal increases, and thus the cathode active material may cause a side reaction with the electrolyte, elution of the transition metal, or the like, to occur. Therefore, when the electrolyte additive of Chemical Formula 1 according to an embodiment of the present disclosure is used, it is presumed that the cation mixing of the ions can be minimized.

Meanwhile, the anode active material may comprise amorphous carbon or crystalline carbon, and specific examples thereof may include carbons such as non-graphitizable carbon, graphite-based carbon, and the like; metal complex oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, Group 2, Group 3 elements of the periodic table, or halogen; $0 < x \leq 1$; $1 \leq y \leq 3$; $1 \leq z \leq 8$), and the like; lithium metal; lithium alloys; silicon-based alloys; tin-based alloys; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, and the like; conductive polymers such as polyacetylene, and the like; and Li-Co-Ni-based materials, and the like.

The separator may be produced using a porous polymer film, for example, made of a polyolefin-based polymer such as an ethylene homopolymer, a propylene homopolymer, an ethylene/butene copolymer, an ethylene/hexene copolymer, an ethylene/methacrylate copolymer, or the like, either alone or constructed by stacking two or more porous polymer films. In addition, a conventional porous non-woven fabric, for example, a non-woven fabric made of a glass fiber having a high melting point, polyethylene terephthalate fiber, or the like, may be used, but the separator is not limited thereto.

The cathode and/or the anode may be produced by mixing and stirring a binder and a solvent, and if necessary, a conventionally usable conductive agent and a dispersant to prepare a slurry, and then applying and compressing the slurry to a current collector.

Examples of the binder may include various kinds of binder polymers, such as polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, ethylene-propylene-diene monomer (EPDM), sulfonated EPDM, styrene butylene rubber (SBR), fluorine rubber, various copolymers, and the like.

According to an embodiment of the present disclosure, the lithium secondary battery comprising the additive may be subjected to a formation and aging processes to secure the performance of the secondary battery.

The formation process activates the battery through repetition of the charge and discharge processes after assembly of the battery, whereby the lithium ions from the lithium metal oxide used as the cathode during charging are migrated and intercalated into the carbon electrode used as the anode. Lithium has strong reactivity to react with the carbon anode to produce compounds such as $Li_2CO_3$, LiO, LiOH, and the like, which form a solid electrolyte interface (SEI) coating film on the surface of the anode. In addition, the aging process stabilizes the activated battery by allowing the battery to stand for a predetermined period of time.

The SEI film is formed on the surface of the anode through the above-described formation process. Here, it is general for SEI films to be stabilized by a room temperature aging process, i.e., by allowing the battery to stand at room temperature for a predetermined period of time. However, it may be confirmed that for the lithium secondary battery using the non-aqueous electrolyte comprising the additive according to the embodiment of the present disclosure, not only when a room temperature aging process is performed, but even when a high temperature aging process is employed, problems such as reduction in the stability of the SEI film, degradation thereof, and the like, due to the high temperature may not occur thanks to the Cs and Rb, which are homologous elements to lithium.

The formation process is not particularly limited, and the battery may be half-charged at 1.0 to 3.8 V or fully charged at 3.8 to 4.3 V. Further, the battery may be charged at a current density of 0.1 C to 2 C (c-rate) for about 5 minutes to 1 hour.

The aging process may be performed at room temperature or at a temperature range of 60 to 100° C. (high temperature). If the temperature exceeds 100° C., it is possible that an exterior material may be ruptured or the battery may be ignited due to evaporation of the electrolyte. Further, the remaining capacity (state of charge: SOC) of the battery may be in any range, from the fully charged state of 100% to 0%, due to the discharge. In addition, the storage time is not particularly limited, but it is preferable to set the time from about 1 hour to 1 week.

The external shape of the lithium secondary battery according to an embodiment of the present disclosure is not particularly limited, but a cylindrical shape using a can, a prismatic shape, a pouch shape, a coin shape, or the like, may be employed.

Hereinafter, the present disclosure is described in detail with reference to Examples. However, the following Examples according to the present disclosure may be modified into various embodiments, and should not be interpreted as limiting the scope of the present disclosure. These Examples of the present disclosure are provided so that those skilled in the art may gain a more thorough understanding of the present disclosure.

EXAMPLES AND COMPARATIVE EXAMPLES

Example 1

[Preparation of Electrolyte]

A non-aqueous electrolyte was prepared by adding a non-aqueous organic solvent comprising ethylene carbonate (EC), ethyl methyl carbonate (EMC) and diethyl carbonate (DEC) at a volume ratio of 30:50:20, and $LiPF_6$ as a lithium salt in an amount of 1.15 mol/L based on the total amount of the non-aqueous electrolyte, and by then adding cesium bis(trifluoromethanesulfonyl)imide as an electrolyte additive at an amount of 0.5 wt % based on the total amount of the non-aqueous electrolyte.

[Manufacture of Lithium Secondary Battery]

A cathode mixture slurry was prepared by adding 92 wt % of $Li(Ni_{0.5}Co_{0.2}Mn_{0.3})O_2$ as a cathode active material, 4 wt % of carbon black as a conductive agent, and 4 wt % of polyvinylidene fluoride (PVDF) as a binder, to N-methyl-2-pyrrolidone (NMP) as a solvent. The cathode mixture slurry was applied onto an aluminum (Al) thin film as a cathode current collector at a thickness of about 20 μm and dried to produce a cathode, followed by employment of a roll press to complete the cathode.

Further, an anode mixture slurry was prepared by adding 96 wt % of carbon powder as an anode active material, 3 wt % of PVDF as a binder, and 1 wt % of carbon black as a conductive agent, to NMP as a solvent. The anode mixture slurry was applied onto a copper (Cu) thin film as an anode current collector at a thickness of 10 μm and dried to produce an anode, followed by employment of a roll press to complete the anode.

A pouch-type battery was manufactured by a conventional method using the prepared cathode and anode together with a separator composed of three layers of polypropylene/polyethylene/polypropylene (PP/PE/PP), and the prepared non-aqueous electrolyte was then injected into the battery to complete the manufacture of a lithium secondary battery.

Example 2

A non-aqueous electrolyte and a lithium secondary battery were manufactured in the same manner as in Example 1, except that 0.7 wt % of cesium bis(trifluoromethanesulfonyl)imide was included as an electrolyte additive.

Example 3

A non-aqueous electrolyte and a lithium secondary battery were manufactured in the same manner as in Example 1, except that 1 wt % of cesium bis(trifluoromethanesulfonyl)imide was included as an electrolyte additive.

Example 4

A non-aqueous electrolyte and a lithium secondary battery were manufactured in the same manner as in Example 1, except that 3 wt % of cesium bis(trifluoromethanesulfonyl)imide was included as an electrolyte additive.

Example 5

A non-aqueous electrolyte and a lithium secondary battery were manufactured in the same manner as in Example 1, except that 0.5 wt % of cesium nitrate was included instead of cesium bis(trifluoromethanesulfonyl)imide as an electrolyte additive.

Example 6

A non-aqueous electrolyte and a lithium secondary battery were manufactured in the same manner as in Example 1, except that 0.7 wt % of cesium nitrate was included instead of cesium bis(trifluoromethanesulfonyl)imide as an electrolyte additive.

Example 7

A non-aqueous electrolyte and a lithium secondary battery were manufactured in the same manner as in Example 1, except that 1.0 wt % of cesium nitrate was included instead of cesium bis(trifluoromethanesulfonyl)imide as an electrolyte additive.

Example 8

A non-aqueous electrolyte and a lithium secondary battery were manufactured in the same manner as in Example 1, except that 3.0 wt % of cesium nitrate was included instead of cesium bis(trifluoromethanesulfonyl)imide as an electrolyte additive.

Example 9

A non-aqueous electrolyte and a lithium secondary battery were manufactured in the same manner as in Example 1, except that 0.5 wt % of rubidium bis(trifluoromethanesulfonyl)imide was included instead of cesium bis(trifluoromethanesulfonyl)imide as an electrolyte additive.

Example 10

A non-aqueous electrolyte and a lithium secondary battery were manufactured in the same manner as in Example 1, except that 0.5 wt % of rubidium nitrate was included instead of cesium bis(trifluoromethanesulfonyl)imide as an electrolyte additive.

Example 11

A non-aqueous electrolyte and a lithium secondary battery were manufactured in the same manner as in Example 1, except that 0.5 wt % of cesium bis(trifluoromethanesulfonyl)imide based on the total amount of the non-aqueous electrolyte and 0.5 wt % of lithium difluoro bis(oxalato) phosphate were included as an electrolyte additive.

Example 12

A non-aqueous electrolyte and a lithium secondary battery were manufactured in the same manner as in Example 1, except that 0.5 wt % of cesium nitrate based on the total amount of the non-aqueous electrolyte and 0.5 wt % of lithium difluoro bis(oxalato) phosphate were included instead of cesium bis(trifluoromethanesulfonyl)imide as an electrolyte additive.

Example 13

A non-aqueous electrolyte and a lithium secondary battery were manufactured in the same manner as in Example 1, except that $Li[Ni_{1/3}Co_{1/3}Mn_{1/3}]O_2$ was used as a cathode active material.

Example 14

A non-aqueous electrolyte and a lithium secondary battery were manufactured in the same manner as in Example 1, except that $LiCoO_2$ was used as a cathode active material.

Example 15

A non-aqueous electrolyte and a lithium secondary battery were manufactured in the same manner as in Example 1, except that 0.03 wt % of cesium bis(trifluoromethanesulfonyl)imide was included as an electrolyte additive to the non-aqueous electrolyte.

Example 16

A non-aqueous electrolyte and a lithium secondary battery were manufactured in the same manner as in Example 1, except that 11 wt % of cesium bis(trifluoromethanesulfonyl)imide was included as an electrolyte additive to the non-aqueous electrolyte.

Example 17

A non-aqueous electrolyte and a lithium secondary battery were manufactured in the same manner as in Example 1, except that 0.03 wt % of cesium nitrate was included instead of cesium bis(trifluoromethanesulfonyl)imide as an electrolyte additive to the non-aqueous electrolyte.

Example 18

A non-aqueous electrolyte and a lithium secondary battery were manufactured in the same manner as in Example 1, except that 11 wt % of cesium nitrate was included instead of cesium bis(trifluoromethanesulfonyl)imide as an electrolyte additive to the non-aqueous electrolyte.

Experiment and Evaluation

High Temperature Lifetime Evaluation

The lithium secondary test batteries were charged at a constant current until the voltage reached 4.20 V (vs. Li) at a current of 1.5 C rate at a high temperature (45° C.). Subsequently, the lithium secondary batteries were cut-off at a current of 0.05 C rate while maintaining 4.20 V in a constant voltage mode. Next, the lithium secondary batteries were discharged at a constant current of 1.5 C rate until the voltage reached 3.0 V (vs. Li) at the time of discharging the batteries (1st cycle). The above-described cycle was repeated up to 300 cycles. The results of the above-described experiment are shown in Tables 1 and 2.

TABLE 1

| | High Temperature Lifetime Characteristics | | |
|---|---|---|---|
| Remarks | $1^{st}$ Cycle Capacity (mAh) | $300^{th}$ Cycle Capacity (mAh) | Capacity Retention Rate (%) $300^{th}$ Capacity/$1^{st}$ Capacity*100(%) |
| Example 1 | 911.2 | 644.31 | 70.71 |
| Example 2 | 910.74 | 638.70 | 70.13 |
| Example 3 | 910.09 | 632.60 | 69.51 |
| Example 4 | 898.21 | 612.04 | 68.14 |
| Example 5 | 908.49 | 634.94 | 69.89 |
| Example 6 | 907.89 | 628.35 | 69.21 |
| Example 7 | 907.18 | 619.97 | 68.34 |
| Example 8 | 905.63 | 608.22 | 67.16 |
| Example 9 | 902.15 | 624.38 | 69.21 |
| Example 10 | 901.24 | 615.01 | 68.24 |
| Example 11 | 912.13 | 644.69 | 70.68 |
| Example 12 | 908.29 | 635.62 | 69.98 |
| Example 13 | 912.13 | 636.76 | 69.81 |
| Example 14 | 908.29 | 623.81 | 68.68 |

TABLE 2

| | High Temperature Lifetime Characteristics | | |
|---|---|---|---|
| Remarks | $1^{st}$ Cycle Capacity (mAh) | $300^{th}$ Cycle Capacity (mAh) | Capacity Retention Rate (%) $300^{th}$ Capacity/$1^{st}$ Capacity*100(%) |
| Example 15 | 907.97 | 546.42 | 60.18 |
| Example 16 | 889.23 | 501.08 | 56.35 |
| Example 17 | 908.31 | 544.35 | 59.93 |
| Example 18 | 884.23 | 480.58 | 54.35 |

Low Temperature Lifetime Evaluation

The lithium secondary batteries were charged at room temperature (25° C.)—low temperature (−10° C.)—low temperature (−20° C.)—room temperature (25° C.) at a constant current until the voltage reached 4.20 V (vs. Li) at a current of 0.5 C rate. Subsequently, the lithium secondary batteries were cut-off at a current of 0.05 C rate while maintaining 4.20 V in a constant voltage mode. Next, the lithium secondary batteries were discharged at a constant current of 0.5 C rate until the voltage reached 3.0 V (vs. Li) at the time of discharging the battery (1st cycle). The above-described cycle was repeated 10 times for each temperature, sequentially. The capacity after the last cycle at each temperature was measured after repeating the cycle 10 times, and the capacity of the final cycle was measured after the completion of all the cycles (at room temperature (25° C.)—low temperature (−10° C.)—low temperature (−20° C.)—room temperature (25° C.)) to calculate the capacity retention rate. The results of the above-described charge/discharge experiment are shown in Tables 3 and 4.

TABLE 3

Low Temperature Lifetime Evaluation

| Remarks | Room Temperature Cycle Capacity (mAh) | −10° C. Cycle Capacity (mAh) | −20° C. Cycle Capacity (mAh) | Room Temperature Cycle Capacity after Low Temperature Evaluation (mAh) | Capacity Retention Rate (%) Room Temperature Capacity After Low Temperature Evaluation/Initial Room Temperature Capacity * 100(%) |
|---|---|---|---|---|---|
| Example 1 | 899.25 | 536.72 | 218.85 | 415.82 | 46.24 |
| Example 2 | 898.16 | 534.12 | 217.5 | 413.17 | 46.00 |
| Example 3 | 897.84 | 532.48 | 216.82 | 411.15 | 45.79 |
| Example 4 | 896.68 | 529.28 | 214.96 | 405.29 | 45.20 |
| Example 5 | 896.81 | 533.18 | 215.18 | 412.3 | 45.97 |
| Example 6 | 895.18 | 531.84 | 214.79 | 407.17 | 45.48 |
| Example 7 | 893.37 | 529.76 | 213.14 | 402.23 | 45.02 |
| Example 8 | 890.19 | 526.27 | 211.41 | 399.41 | 44.87 |
| Example 9 | 890.84 | 527.18 | 208.24 | 405.74 | 45.55 |
| Example 10 | 887.21 | 526.87 | 206.74 | 401.84 | 45.29 |
| Example 11 | 900.84 | 537.86 | 219.72 | 416.62 | 46.25 |
| Example 12 | 897.75 | 534.74 | 216.71 | 413.21 | 46.03 |
| Example 13 | 898.54 | 532.18 | 216.48 | 413.96 | 46.07 |
| Example 14 | 896.43 | 530.26 | 214.86 | 411.52 | 45.91 |

TABLE 4

Low Temperature Lifetime Evaluation

| Remarks | Room Temperature Cycle Capacity (mAh) | −10° C. Cycle Capacity (mAh) | −20° C. Cycle Capacity (mAh) | Room Temperature Cycle Capacity after Low Temperature Evaluation (mAh) | Capacity Retention Rate (%) Room Temperature Capacity After Low Temperature Evaluation/Initial Room Temperature Capacity * 100(%) |
|---|---|---|---|---|---|
| Example 15 | 896.96 | 363.06 | 111.68 | 285.82 | 31.87 |
| Example 16 | 889.19 | 353.45 | 104.18 | 272.14 | 30.61 |
| Example 17 | 895.86 | 361.06 | 110.2 | 283.13 | 31.60 |
| Example 18 | 887.52 | 352.13 | 102.23 | 270.17 | 30.44 |

60° C. Storage Characteristics

The secondary batteries of the Examples and Comparative Examples were placed in a chamber maintained at 25° C. and subjected to charge/discharge tests as follows using a charge/discharge device. First, the secondary batteries were charged up to 60% of SOC (state of charge) at 1 C, and then discharged/charged at 0.2 C for 10 seconds. Next, the batteries were discharged/charged at 0.5 C for 10 seconds. Thereafter, the secondary batteries were discharged and charged for 10 seconds in the same manner as above in the following sequences: 1 C, 2 C, and 3 C. Finally, the secondary batteries were charged at a current of 0.5 C to a voltage of 4.2 V. The initial impedance (DC-IR) was determined by calculating the slope of a trend line of the voltage-to-current graph constructed using the voltage values measured after discharging the batteries at 0.2 C, 0.5 C, 1 C, 2 C, and 3 C. After measurement of the initial impedance, the batteries were placed in a chamber maintained at 60° C., and the impedance thereof was measured for 4 weeks (measured every week until the 4th week) to calculate the impedance (DC-IR). Results thereof are shown in Tables 5 and 6.

TABLE 5

Storage Characteristics

| Remarks | Initial Impedance (mΩ) | Impedance After 60° C. Storage (mΩ) (after 4 W) | Change Rate (%) After 60° C. (mΩ)/Initial Impedance (mΩ) * 100(%) |
|---|---|---|---|
| Example 1 | 47.5 | 79 | 166.32 |
| Example 2 | 47.8 | 80.6 | 168.62 |
| Example 3 | 48.4 | 81.9 | 169.21 |
| Example 4 | 50.1 | 85.6 | 170.86 |
| Example 5 | 48.4 | 84 | 173.55 |
| Example 6 | 48.9 | 85.1 | 174.03 |
| Example 7 | 49.8 | 87.4 | 175.50 |
| Example 8 | 51.4 | 91.7 | 178.40 |
| Example 9 | 48.1 | 81.1 | 168.61 |
| Example 10 | 50.1 | 87.5 | 174.65 |
| Example 11 | 47.2 | 78.8 | 166.95 |
| Example 12 | 48.1 | 83.4 | 173.39 |
| Example 13 | 47.9 | 80.8 | 168.68 |
| Example 14 | 48.2 | 82.1 | 170.33 |

TABLE 6

Storage Characteristics

| Remarks | Initial Impedance (mΩ) | Impedance After 60° C. Storage (mΩ) (after 4 W) | Change Rate (%) After 60° C. (mΩ)/Initial Impedance (mΩ) * 100(%) |
|---|---|---|---|
| Example 15 | 43.1 | 82.2 | 190.72 |
| Example 16 | 45.5 | 90.6 | 199.12 |
| Example 17 | 42.9 | 82.4 | 192.07 |
| Example 18 | 46.1 | 92.5 | 200.65 |

Measurement of Thickness Change Rate

The following experiments were performed to evaluate the thickness change rate of each of the secondary batteries manufactured according to the Examples and Comparative Examples.

Lifetime characteristics of the lithium secondary batteries were confirmed by charging and discharging the batteries at 0.1 C for the 1st cycle, followed by charging and discharging at 0.5 C for the subsequent cycles. The thickness change rate was measured by disassembling each of the lithium secondary batteries in a charged state at the 300th cycle, respectively, measuring the electrode thickness at the 300th cycle, and comparing the measured electrode thickness values with the electrode thickness determined before the 1st cycle. Results thereof are shown in Tables 7 and 8.

Thickness Change Rate: (electrode thickness in a charged state at the 300th cycle—electrode thickness before 1st cycle)/electrode thickness before 1st cycle×100

TABLE 7

| Remarks | Thickness Change Rate (%) |
| --- | --- |
| Example 1 | 107.24 |
| Example 2 | 107.66 |
| Example 3 | 108.18 |
| Example 4 | 109.14 |
| Example 5 | 108.53 |
| Example 6 | 108.75 |
| Example 7 | 109.09 |
| Example 8 | 110.24 |
| Example 9 | 108.19 |
| Example 10 | 109.23 |
| Example 11 | 108.36 |
| Example 12 | 109.98 |
| Example 13 | 108.96 |
| Example 14 | 108.78 |

TABLE 8

| Remarks | Thickness Change Rate (%) |
| --- | --- |
| Example 15 | 113.21 |
| Example 16 | 117.25 |
| Example 17 | 114.12 |
| Example 18 | 118.29 |

It could be confirmed from the tables above that in view of the high temperature and low temperature lifetime characteristics, the high temperature storage characteristics, and the thickness change rate, the secondary batteries of the Examples of the present disclosure generally had excellent performance.

Example 19

[Preparation of Electrolyte]

A non-aqueous electrolyte was prepared by adding a non-aqueous organic solvent having a composition of ethylene carbonate (EC): ethylmethyl carbonate (EMC): diethyl carbonate (DEC)=30:50:20 (volume ratio), $LiPF_6$ as a lithium salt in an amount of 1.15 mol/L, and 0.5 wt % of cesium bis(trifluoromethanesulfonyl)imide and 1 wt % of lithium difluoro bis(oxalato) phosphate (weight ratio 1:2) based on the total amount of the non-aqueous electrolyte as an additive.

[Production of Lithium Secondary Battery]

A cathode mixture slurry was prepared by adding 92 wt % of $Li(Ni_{0.5}Co_{0.2}Mn_{0.3})O_2$ as a cathode active material, 4 wt % of carbon black as a conductive agent, and 4 wt % of polyvinylidene fluoride (PVdF) as a binder, to N-methyl-2-pyrrolidone (NMP) as a solvent. The cathode mixture slurry was applied onto an aluminum (Al) thin film as a cathode current collector at a thickness of about 20 μm and dried to produce a cathode, followed by employment of a roll press to complete the cathode.

Further, an anode mixture slurry was prepared by adding 96 wt % of carbon powder as an anode active material, 3 wt % of PVdF as a binder, and 1 wt % of carbon black as a conductive agent, to NMP as a solvent. The anode mixture slurry was applied onto a copper (Cu) thin film as an anode current collector at a thickness of 10 μm and dried to produce an anode, followed by employment of a roll press to complete the anode.

A pouch-type battery was produced by a conventional method using the above-constructed cathode and anode together with a separator composed of three layers of polypropylene/polyethylene/polypropylene (PP/PE/PP), into which the prepared non-aqueous electrolyte was injected to complete the manufacture of the lithium secondary battery.

Example 20

A non-aqueous electrolyte and a lithium secondary battery were prepared in the same manner as in Example 19, except that 0.5 wt % of cesium bis(trifluoromethanesulfonyl)imide and 0.5 wt % of lithium difluoro bis(oxalato) phosphate (weight ratio 1:1) were included as the electrolyte additive.

Example 21

A non-aqueous electrolyte and a lithium secondary battery were prepared in the same manner as in Example 19, except that 0.5 wt % of cesium bis(trifluoromethanesulfonyl)imide and 2 wt % of lithium difluoro bis(oxalato) phosphate (weight ratio 1:4) were included as the electrolyte additive.

Example 22

A non-aqueous electrolyte and a lithium secondary battery were prepared in the same manner as in Example 19, except that 0.5 wt % of rubidium bis(trifluoromethanesulfonyl) imide and 1 wt % of lithium difluoro bis oxlato phosphate (weight ratio 1:2) were included as the electrolyte additive.

Example 23

A non-aqueous electrolyte and a lithium secondary battery were prepared in the same manner as in Example 19, except that 0.5 wt % of cesium bis(trifluoromethanesulfonyl)imide and 0.25 wt % of lithium difluoro bis oxlato phosphate (weight ratio 1:0.5) were included as the electrolyte additive.

Example 24

A non-aqueous electrolyte and a lithium secondary battery were prepared in the same manner as in Example 19, except that 0.5 wt % of cesium bis(trifluoromethanesulfonyl)imide and 2.25 wt % of lithium difluoro bis oxlato phosphate (weight ratio 1:4.5) were included as the electrolyte additive.

Example 25

A non-aqueous electrolyte and a lithium secondary battery were prepared in the same manner as in Example 19, except that the 0.5 wt % of cesium bis(trifluoromethanesulfonyl) imide and 0.5 wt % of lithium difluoro bis oxlato phosphate (weight ratio 1:1) were included as the electrolyte additive.

Comparative Example 1

A non-aqueous electrolyte and a lithium secondary battery were prepared in the same manner as in Example 15 except that 0.5 wt % of cesium bis(trifluoromethanesulfonyl)imide and 0.5 wt % of gamma butylo lacton (GBL) (weight ratio 1:1) were included as the electrolyte additive.

Evaluation of High Temperature Output Characteristics

The output was calculated by determining the voltage difference generated after the lithium secondary batteries of Example 1, Examples 19 to 25, and Comparative Example 1 were stored at 60° C. and then discharged for 10 seconds at SOC 50% at 5C. Results thereof are shown in FIG. 1.

Referring to FIG. 1, it could be appreciated that regardless of the storage period, the lithium secondary batteries of Examples 19 to 25 simultaneously comprising cesium bis(trifluoromethanesulfonyl)imide (or rubidium bis(trifluoromethanesulfonyl)imide, cesium bis(fluorosulfonyl)imide) and lithium difluoro bis oxlato phosphate at a predetermined weight ratio had excellent high temperature output as compared to Example 1 and Comparative Example 1. In particular, it could be seen that the difference in the high temperature output characteristics was much larger after the storage period of 7 weeks.

The secondary batteries formed by including the electrolyte additive according to an embodiment of the present invention may have excellent high temperature output characteristics, low temperature lifetime characteristics, high temperature storage characteristics, and thickness change rate.

Further, the secondary batteries formed by including the electrolyte additive comprising a salt of an anion with $Cs^+$ or $Rb^+$, the anion being derived from a nitrogen atom-containing compound, and lithium difluoro bis(oxalato) according to another embodiment of the present invention may have excellent high temperature output characteristics.

What is claimed is:

1. An electrolyte additive comprising:
   a salt of an anion with Cs+ or Rb+, and the anion being derived from a nitrogen atom-containing compound,
   wherein the anion derived from a nitrogen atom-containing compound is one or more selected from the group consisting of amide-based anions, imide-based anions, nitrile-based anions, nitrite anions, and nitrate anions,
   wherein the imide-based anion is represented by Chemical Formula 1 below,

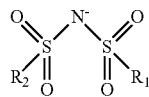

[Chemical Formula 1]

(Here, $R_1$ and $R_2$ are each a fluoro group or a $C_1$-$C_4$ fluoroalkyl group, or $R_1$ and $R_2$ may be linked to each other to form a $C_1$-$C_4$ fluoro cycloalkylene ring),
   wherein the electrolyte additive further comprises lithium difluoro bis oxalato phosphate,
   wherein the electrolyte additive comprises the salt of an anion with Cs+ or Rb+ and the lithium difluoro bis oxalato phosphate at a weight ratio of 1:1 to 1:4.

2. The electrolyte additive of claim 1, wherein the compound represented by Chemical Formula 1 includes one or more selected from the group consisting of Chemical Formulas 2 to 6 below.

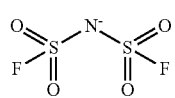

[Chemical Formula 2]

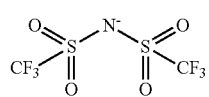

[Chemical Formula 3]

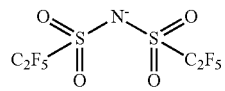

[Chemical Formula 4]

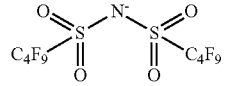

[Chemical Formula 5]

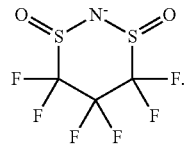

[Chemical Formula 6]

3. The electrolyte additive of claim 1, wherein the electrolyte additive comprises one or more selected from the group consisting of cesium bis(trifluoromethanesulfonyl)imide, cesium nitrate, rubidium bis(trifluoromethanesulfonyl)imide, rubidium nitrate, and cesium bis(fluorosulfonyl)imide.

4. A non-aqueous electrolyte comprising:
   a lithium salt;
   a non-aqueous organic solvent; and
   the electrolyte additive of claim 1.

5. The non-aqueous electrolyte of claim 4, wherein the content of the additive is 0.05 to 10 wt % based on a total amount of the non-aqueous electrolyte.

6. The non-aqueous electrolyte of claim 4, wherein the lithium salt includes one or more selected from a group consisting of $LiPF_6$, LiFSI, $LiAsF_6$, $LiCF_3SO_3$, $LiN(CF_3SO_2)_2$, $LiBF_4$, $LiSbF_6$, $LiN(C_2F_5SO_2)_2$, $LiAlO_4$, $LiAlCl_4$, $LiSO_3CF_3$, LiTFSI, LiDFOB, and $LiClO_4$.

7. The non-aqueous electrolyte of claim 4, wherein the lithium salt includes $LiPF_6$.

8. The non-aqueous electrolyte of claim 4, wherein the non-aqueous organic solvent includes one or more selected from the group consisting of ether, ester, amide, linear carbonate, cyclic carbonate, phosphate-based compounds, nitrile-based compounds, fluorinated ether-based compounds, and fluorinated aromatic-based compounds.

9. A lithium secondary battery comprising:
   a cathode employing a cathode active material;
   an anode employing an anode active material;
   a separator interposed between the cathode and the anode; and
   the non-aqueous electrolyte of claim 4.

10. The lithium secondary battery of claim 9, wherein the cathode active material includes one or more compounds from a group consisting of the compounds represented by Chemical Formulas 7 to 9 below:

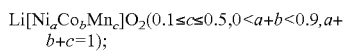

[Chemical Formula 7]

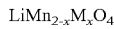

[Chemical Formula 8]

(M is one or more elements selected from a group consisting of Ni, Co, Fe, P, S, Zr, Ti and Al, $0<x\leq2$);

[Chemical Formula 9]

(M is one or more elements selected from a group consisting of Al, Mg, Ni, Co, Mn, Ti, Ga, Cu, V, Nb, Zr, Ce, In, Zn and Y, X is one or more elements selected from a group consisting of O, F, and N, A is P, S or a mixture element thereof, $0\leq a\leq0.2$, $0.5\leq x\leq1$.

11. The lithium secondary battery of claim 9, wherein the cathode active material includes one or more selected from a group consisting of $Li[Ni_{0.6}Co_{0.2}Mn_{0.2}]$, $Li(Ni_{0.5}Co_{0.2}Mn_{0.3})O_2$, $Li[Ni_{1/3}Co_{1/3}Mn_{1/3}]O_2$, and $LiCoO_2$.

* * * * *